(12) United States Patent
Sato et al.

(10) Patent No.: US 8,157,968 B2
(45) Date of Patent: Apr. 17, 2012

(54) OVEN OBSERVING EQUIPMENT AND PUSH-OUT RAM HAVING THE SAME

(75) Inventors: Manabu Sato, Kakogawa (JP);
Hironobu Inamasu, Kakogawa (JP);
Kiyoshi Nakata, Saijo (JP); Keiji Yoshimoto, Saijo (JP)

(73) Assignee: Kansai Coke and Chemicals Co., Ltd., Hyogo (JP)

( * ) Notice: Subject to any disclaimer, the term of this patent is extended or adjusted under 35 U.S.C. 154(b) by 837 days.

(21) Appl. No.: 12/224,336

(22) PCT Filed: Jan. 12, 2007

(86) PCT No.: PCT/JP2007/050288
§ 371 (c)(1),
(2), (4) Date: Aug. 25, 2008

(87) PCT Pub. No.: WO2007/097133
PCT Pub. Date: Aug. 30, 2007

(65) Prior Publication Data
US 2009/0134005 A1 May 28, 2009

(30) Foreign Application Priority Data
Feb. 27, 2006 (JP) .................................. 2006-050454

(51) Int. Cl.
*C10B 45/00* (2006.01)
*F21V 29/00* (2006.01)
(52) U.S. Cl. .......... 202/262; 202/270; 348/83; 361/697; 362/373
(58) Field of Classification Search .................. 202/239, 202/262, 270; 348/82, 83; 361/690, 697, 361/709, 714; 362/373; 62/3.2, 3.7
See application file for complete search history.

(56) References Cited

U.S. PATENT DOCUMENTS

| | | | | |
|---|---|---|---|---|
| 3,141,987 A | * | 7/1964 | Altman | 313/17 |
| 3,464,218 A | * | 9/1969 | Buck | 62/3.2 |
| 4,131,914 A | * | 12/1978 | Bricmont | 348/83 |
| 5,162,906 A | * | 11/1992 | Yorita et al. | 348/83 |
| 6,002,993 A | * | 12/1999 | Naito et al. | 702/154 |

FOREIGN PATENT DOCUMENTS

| | | | |
|---|---|---|---|
| JP | 5-27599 U | | 4/1993 |
| JP | 9-203950 A | | 8/1997 |
| JP | 10-257360 | * | 9/1998 |
| JP | 2003-115686 A | | 4/2003 |

* cited by examiner

*Primary Examiner* — Jill Warden
*Assistant Examiner* — Joye L Woodard
(74) *Attorney, Agent, or Firm* — Birch, Stewart, Kolasch & Birch, LLP

(57) ABSTRACT

An oven observing equipment capable of observing the inside of an oven turned to a high temperature precisely includes: a housing 13 having an intake part for cooling air, and a discharging part for discharging the cooling air after being used for cooling; and an imaging device 20 contained in this housing 13 near the discharge part. This imaging device 20 is composed of integrated combination of an image sensor 16; plate-like thermoelectric cooling elements 18a to 18d arranged in a state that their heat-absorbing faces surround the periphery of a body of the image sensor; thermoconductive blocks 17a to 17d embedded in the gaps between the image sensor body and the thermoelectric cooling elements 18a to 18d; and cooling fins 19a to 19d formed on the heat-radiating faces of the thermoelectric cooling elements 18a to 18d are integrated with each other.

10 Claims, 6 Drawing Sheets

(a)

(b)

OVEN OBSERVING EQUIPMENT AND PUSH-OUT RAM HAVING THE SAME

TECHNICAL FIELD

The present invention relates to an oven observing equipment for observing the inside of an oven turned into a high temperature, and to a push-out ram having an oven observing equipment suitable for observing the inside of a coke oven.

BACKGROUND ART

Coke ovens have a structure wherein a carbonizing chamber and a combustion chamber are alternately arranged in the direction of coke oven battery. From a coal charging car which travels on the top of the coke oven in the direction of coke oven battery, coal is charged into each of the carbonizing chambers, and heat from each of the combustion chambers is transferred to the carbonizing chambers. In such a way, the charged coal is subjected to dry distillation, so as to produce coke.

Many of coke ovens of this type have gone through over thirty years since they were built. Thus, the coke ovens have become decrepit. About firebricks which constitute side walls of the carbonizing chambers, a cycle is repeated wherein carbon adhering to damaged regions of the oven walls is peeled by push-out of coke or charge of coal so that the oven walls are further damaged. As a result, factors of hindering the oven operation, such as a deformation of the oven walls, have been standing out.

In particular, the adhesion state of carbon is delicately varied in daily operations. Thus, to observe the state of the oven wall is an extremely important inspection item for making the operations stable.

When coke is pushed out as illustrated in FIG. 6, specifically, this oven observing is carried out during the oven door is opened and pushing out a red heat coke 51 subjected to dry distillation in a carbonizing chamber 50, by means of a ram head 53 at the tip of a ram beam 52, into a guide car (not illustrated) waiting outside the oven. Usually, the observing is performed by an operator 55 visually at the position of a pushing-out machine operating room 54.

Many restrictions are imposed on the oven observation as follows: the operator cannot go up near the oven since the temperature of the inside of the oven is as high as about 1100° C.; visibility inside the oven is poor since the oven depth is as long as about 15 m while the oven wall width is as narrow as about 450 mm; and the period when the oven inside can be observed, which depends on the temperature for the operation thereof, is restricted into the range of about 2 to 10 minutes.

From such situations, it is said that even if the operator 55 is a skillful person, the operator cannot observe the whole of the oven inside visually. In the figure, reference number 56 represents carbon adhering to the oven wall. The carbon tends to be adhered to regions below individual coal charging openings 57.

Thus, suggested is a method of inserting a camera cooled with water or air into an oven, projecting a wall-face-image taken with the camera onto a screen of a monitor arranged outside the oven, and observing the state of damage (see, for example, Japanese Utility Publication No. 5-27599(U)).

As illustrated in FIG. 7, an oven observing equipment of this type has a cooling tube 62 in the form of a double tube composed of an outer cooling tube 60 and an inner cooling tube 61, and a observing window 63 made of heat-resistant glass is provided to one of side faces of the tip region of this cooling tube 62.

In the cooling tube 62, a reflecting mirror 64 is arranged to oppose to the observing window 63. An optical path bent on the reflecting mirror 64 is guided into a zoom lens 65, thereby making it possible to take an image of a zoomed-up oven wall with a CCD camera 66.

Cooling water or cooling air F is introduced into a passage between the outer cooling tube 60 and the inner cooling tube 61.

A plurality of thermoelectric cooling elements 67 for generating Peltier effect are arranged on the inner wall of the cooling tube 62, so as to protect the CCD camera 66 and other measuring devices from high temperature.

According to the above oven observing equipment, even an unskillful operator can observe the depth of the oven inside. However, according to this oven observing equipment, from the viewpoint of the structure wherein the reflecting mirror 64 and others are used to observe the oven wall indirectly, there are some cases that the oven inside may not be precisely observed because the image projected onto the monitor screen is disturbed or the focal point is shifted out of position only by applying vibration to the equipment, or the like.

Additionally, there remains a problem that the oven observing equipment becomes large-sized since there is a necessity that the optical path from the reflecting mirror 64 to the zoom lens 65 is made long.

The reason why the reflecting mirror 64 is used to observe the oven inside indirectly in this way is that if the CCD camera 66 is arranged near the observing window 63, which is not made of a double tube, the CCD camera 66 is exposed to high temperature so as to break down.

Since the cooling with the thermoelectric cooling elements 67 is indirect cooling through air, the cooling speed is low and the temperature is not easily controlled. Additionally, the cooling is performed in a closed chamber, and thus, the air therein is not stirred so that an even cooling effect and a required temperature fall cannot be obtained. Even if the ability of the thermoelectric cooling elements 67 is desired to be made high, the size of the thermoelectric cooling elements 67 cannot be made large since the space in the cooling tube 62 is limited.

The present invention has been made, considering the above-mentioned problems in conventional oven observing equipments. A first object thereof is to provide an oven observing equipment making it possible to observe the inside of an oven turned into a high temperature precisely. A second object thereof is to provide a push-out ram that has an oven observing equipment and is made compact so that an oven observing equipment can be arranged to a ram beam.

DISCLOSURE OF THE INVENTION

The present invention is an oven observing equipment including a housing having an intake part for cooling air and a discharging part for discharging the cooling air after being used for cooling, and an imaging device contained in this housing near the discharge part, wherein the imaging device is composed of integrated combination of: an image sensor, a plate-like thermoelectric cooling element in which a heat-absorbing face is arranged in a state that it surrounds the periphery of a body of the image sensor, a thermal conductor embedded in the gap between the image sensor body and the heat absorbing faces of thermoelectric cooling element, and cooling fins formed on the heat-radiating face of the thermoelectric cooling element.

In the invention, when the imaging device is contained in the housing so as to be accommodated in a tubular heat insulating part, a cooling passage for causing the cooling air to flow is formed between an outer wall of the heating insulating part and an inner wall of the housing. The equipment can absorb heat invading the inside of the housing through this cooling passage, and discharge the heat from the discharge part.

It is preferred that a heat insulating material is adhered onto the housing inner wall. In this way, heat invading the inside of the cooling passage from the housing can be restrained.

It is also preferred that a observing window is formed in the front face of the housing at a position opposite to a lens of the image sensor, and this observing window is made of a lamination including a heat-resistant glass, an infrared absorbing filter, and an infrared reflecting filter.

When the peripheries of the cooling fins are surrounded by the tubular heat insulating part, gaps between the individual cooling fins constitute a second cooling passage for causing the cooling air to flow. In a state that the cooling air is passed through the cooling passage to restrain the invasion of heat from the outside of the housing, the cooling air is passed through the second cooling passage, thereby high cooling efficiency of the cooling fins can be achieved to cause the thermoelectric cooling element to operate stably.

In addition, a flow direction changing part for changing the flow direction of the cooling air which has passed through the second cooling passage toward the observing window may be formed at an end part of the tubular heat insulating part on the downstream side of the flow direction of the cooling air. This cooling air, the direction of which is converted, acts to blow off dust and others adhered onto the observing window.

The invention is a push-out ram having an oven observing equipment, wherein the oven observing equipment is an oven observing equipment having the above-mentioned structure, and the equipment is arranged to a ram beam of the push-out ram, which is inserted in a coke oven.

In the push-out ram having the oven observing equipment, a hose for supplying the cooling air to the oven observing equipment; a cable for supplying a power source to the image sensor and the thermoelectric cooling element and further outputting a taken image; and a cable for transmitting a control signal for controlling the temperature of the thermoelectric cooling element may be contained in a heat insulating pipe laid on the ram beam.

According to the oven observing equipment of the invention, the inside of an oven turned into a high temperature can be precisely observed.

According to the push-out ram of the invention having the oven observing equipment, the oven observing equipment can be arranged to a ram beam since the push-out ram can be made compact. Thus, in daily operations for pushing out coke, the inside of a carbonizing chamber can be precisely observed at all times.

BEST MODE FOR CARRYING OUT THE INVENTION

Figure 1:
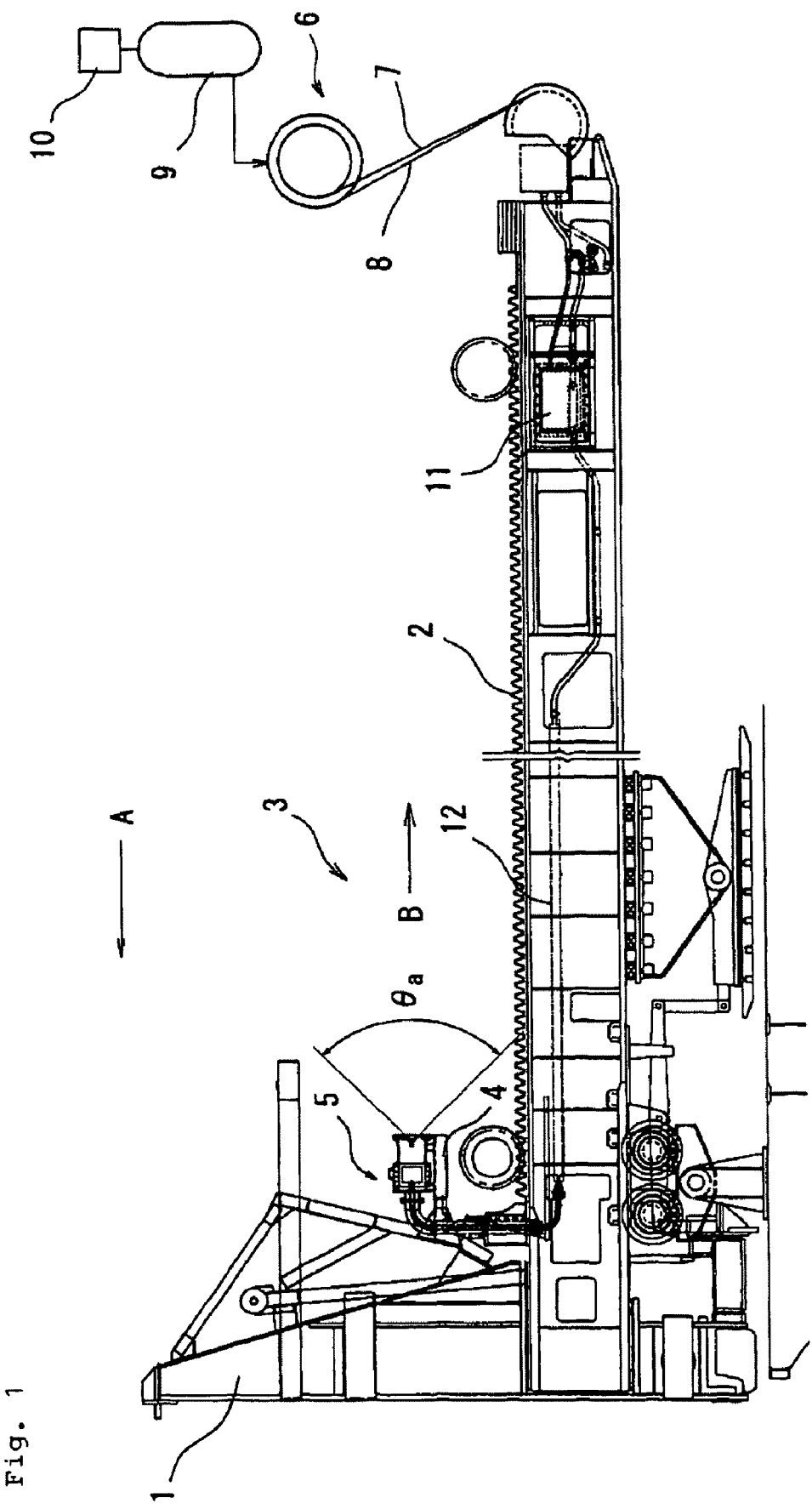
FIG. 1 is a side view illustrating a state that an oven observing equipment according to the invention is arranged to a push-out ram.

The invention will be described in detail hereinafter on the basis of embodiments illustrated in the drawings.

In FIG. 1, a coke pushing-out machine is equipped with a push-out ram 3 having a ram head 1 and a ram beam 2 for reciprocating this ram head 1 horizontally. Red heat coke subjected to dry distillation inside a coke oven is pushed outside the oven by means of the ram head 1.

A supporting stand 4 is stood on the ram beam 2 and near the ram head 1. An oven observing equipment 5 is installed on this supporting stand 4.

In the figure, A represents the direction along which the push-out ram 3 is pushed. B represents the direction of observing by the oven observing equipment 5, and θa represents the field angle of a CCD camera, which will be described later, mounted onto the oven observing equipment 5.

A signal system of the oven observing equipment 5 is connected to a controller in a pushing-out machine operating room not illustrated through a signal/power supply cable 7 wound off from one end side (in a drum axis) of a drum in a winder 6. Images inside the oven can be observed in the operating room. If necessary, the images can be recorded in a recording device.

The signal system specifically includes power supply lines for supplying a power source to the CCD camera and thermoelectric cooling elements (Peltier elements); output lines for outputting image signals taken with the CCD camera; control signal lines for controlling the temperatures of the thermoelectric cooling elements; and the like.

A cooling system for the oven observing equipment 5 is connected to a tank 9 for storing cooling air through a hose 8 wound off from the other end side of the drum in the same winder 6. A compressor 10 for keeping the cooling air at a predetermined pressure (pressure making it possible to supply the same pressure as lost by a pressure loss in piping and on the like, for example, 0.4-0.7 MPa) is connected to this tank 9. The winder 6, the tank 9 and the compressor 10 are set to the pushing-out machine.

Reference number 11 represents a converter/temperature-controller including an image converter for the CCD camera, which will be described later, and an electric source supplier for the thermoelectric cooling elements, which will be described later. The converter/temperature-controller is arranged at the rear end of the ram beam 2, which is not affected by heat inside the oven.

The signal/power supply cable 7 and the hose 8 are passed from the rear end of the ram beam 2 through a heat insulating pipe 12 laid inside the ram beam 2 so as to be connected to the oven observing equipment 5 installed on the forward end side of the ram beam 2. As the signal/power supply cable 7, a heat-resistant cable is used.

Figure 2:
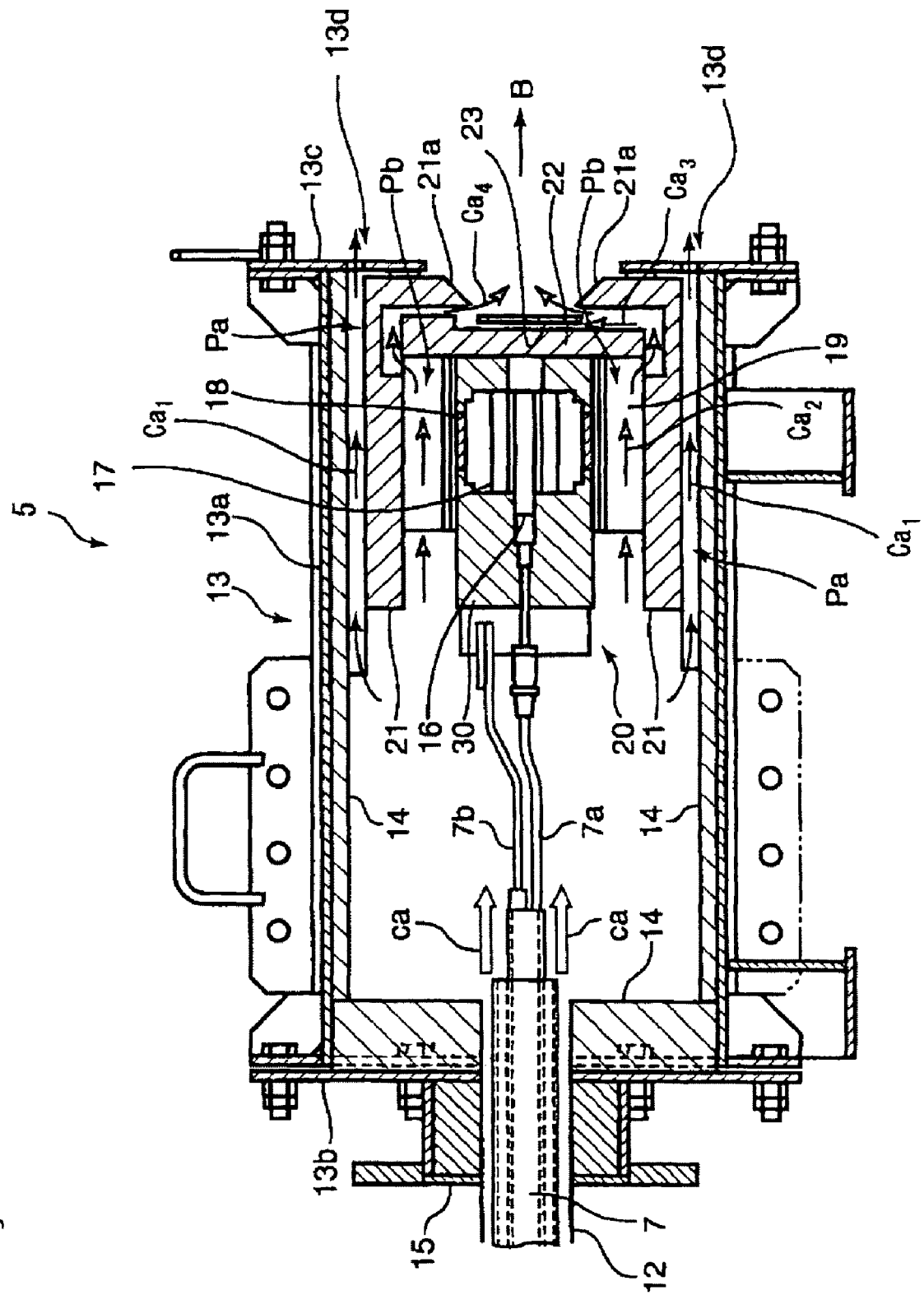
FIG. 2 is an enlarged vertical cross-sectional view of the oven observing equipment illustrated in FIG. 1.

FIG. 2 is an enlarged view of the oven observing equipment 5.

In FIG. 2, the oven observing equipment 5 has a heat-insulated housing 13 in a box form. This housing 13 incorporates a camera with an electric-cooling-device, as an imaging device, wherein minimum requirement devices, such as the CCD camera, the thermoelectric cooling elements and thermocouples for temperature control, are combined with each other.

Specifically, the housing 13 is composed of a rectangular tube-like part 13a, a rear face plate 13b for closing the rear side (the rear side in the observing direction B) end face of this rectangular tube-like part 13a, and a front face plate 13c arranged on the front side. A ceramic heat insulating material 14 is adhered onto each of inner faces of the rectangular tube-like part 13a and an inner face of the rear face plate 13b.

The rear face plate 13b is equipped with a connecting part 15 to which the pipe 12 should be connected. Through the pipe 12, cooling air ca is introduced to the housing 13. Image signals are outputted through a cable 7a for shooting contained in the signal/power source cable 7, and control signals for controlling the temperatures of the thermoelectric cooling elements are transmitted through a control cable 7b. The pipe 12 in the connecting part functions as an intake part for the cooling air ca.

Figure 3:
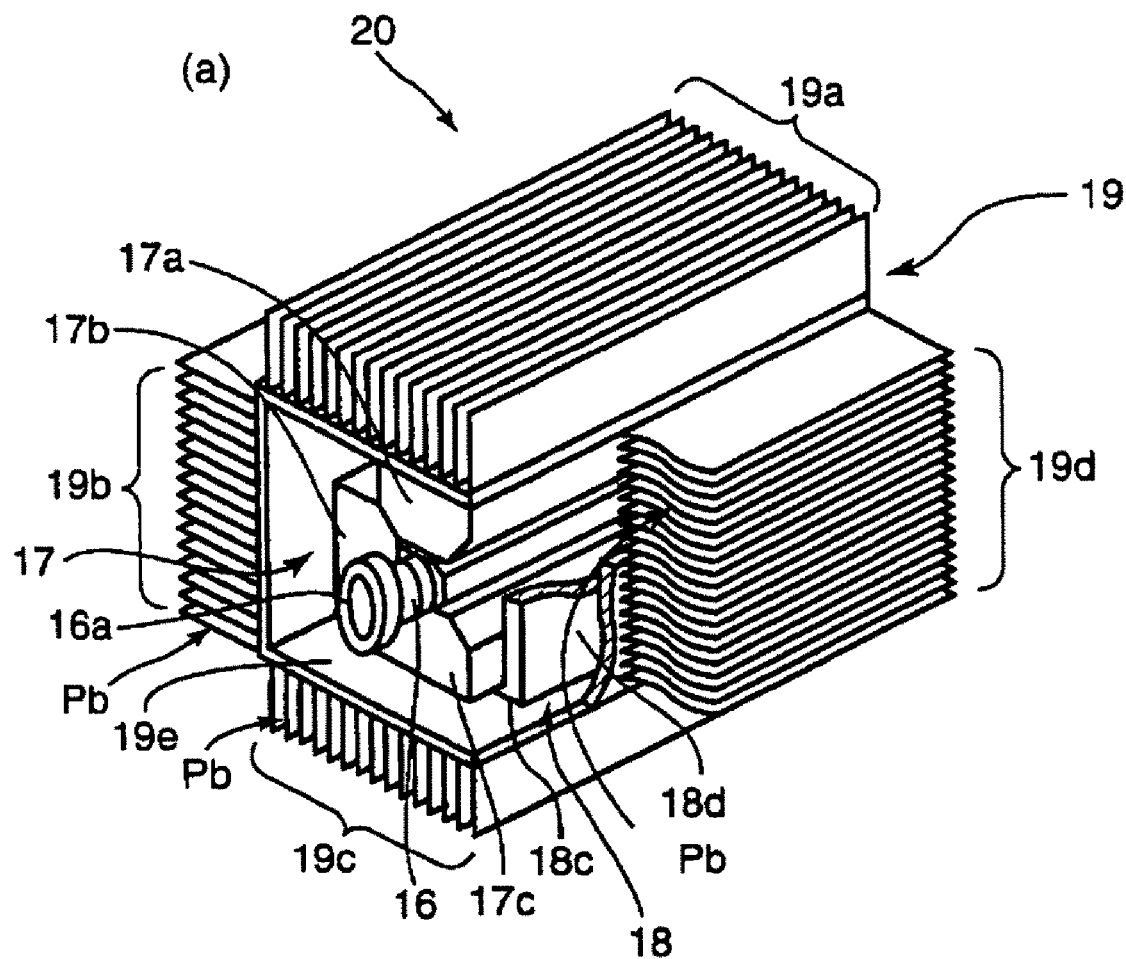
FIG. 3($a$) is a partially-cutaway perspective view illustrating the structure of a camera unit integrated into the oven observing equipment, and FIG. 3($b$) is a front view thereof.
Figure 3:
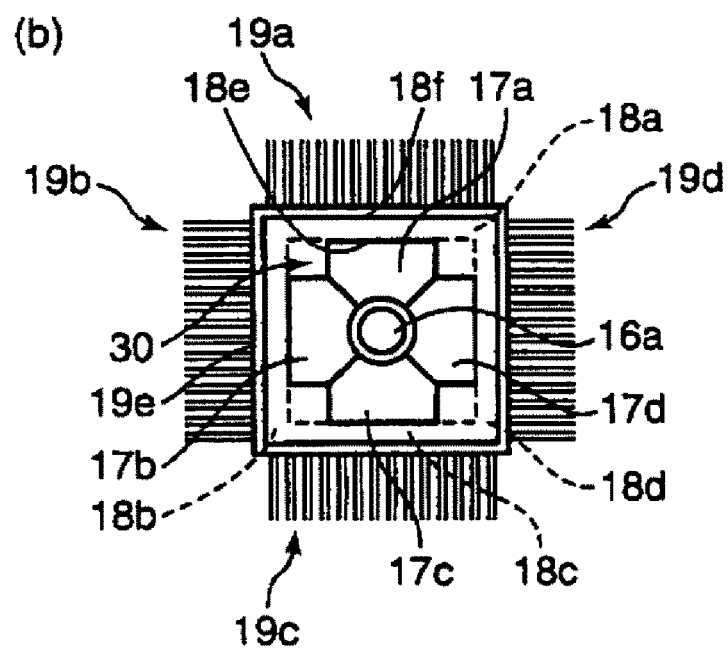

FIG. 3(a) is a partially-cutaway perspective view illustrating the structure of the camera with electronic-cooling-device 20, and FIG. 3(b) is a front view thereof.

In FIG. 3(a), the camera with electronic-cooling-device 20 has a structure wherein the CCD camera 16 as an image sensor; a thermal conductor 17 (FIG. 2) arranged around this CCD camera 16; thermoelectric cooling element group 18 (FIG. 2) arranged outside the thermal conductor 17; and cooling fin group 19 (FIG. 2) arranged outside the thermoelectric cooling element group 18 are integrated each other.

The CCD camera 16 may be composed of, for example, a small-sized color CCD camera equipped with a ½-inch CCD offering 400,000 effective pixels. When the effective pixel number of the CCD camera 16 is about 400,000, the inside of the oven can be observed. Of course, however, a CCD camera having an effective pixel number larger than the number may be used. A wide-angle lens is mounted thereto in order to take, inside the oven, images of its right and left wall faces. However, a lens matching with a purpose may be mounted thereto so as to given images. For example, a zoom lens is mounted thereto when a close-up of a wall face of the oven is required.

Four thermoconductive blocks 17a to 17d made of aluminum and constituting the thermal conductor 17 are arranged around the body of the CCD camera 16 so as to surround the body. The thermoconductive block 17d, which is present on this side of the figure, is taken off for the convenience of describing the internal structure.

The thermoelectric cooling elements 18a to 18d (the elements 18c and 18d are partially visible), are arranged to be adhered closely to the outer faces of the thermoconductive blocks 17a to 17d, respectively, and cover the peripheries of the thermoconductive blocks 17a to 17d in a cage shape.

In FIG. 3(b), the thermoelectric cooling elements 18a-18d are each formed by laminating two plate-like thermoelectric cooling elements onto each other. The thermoelectric cooling element 18a, which is described as a typical example, is arranged to face its heat-absorbing face 18e toward the CCD camera 16 and face its heat-radiating face 18f toward a cooling fin 19a.

When such a structure is adopted, the surface temperature of the body of the CCD camera 16 can be controlled through the thermoconductive blocks 17a to 17d by the thermoelectric cooling element group 18.

The CCD camera 16 surrounded by the thermoconductive blocks 17a to 17d and further surrounded by the thermoelectric cooling element group 18 is contained in a rectangular tube-like case 19e, which is a thermoconductive member. The cooling fin 19a and other cooling fins 19b to 19d, which constitute the cooling fin group 19, are formed on outer wall faces of this case 19e, respectively, so that heat emitted from the thermoelectric cooling element group 18 is radiated.

Small gaps formed between the inner walls of the case 19e and four corners of the thermoconductive blocks 17a to 17d are stuffed up with a heat insulating material 30, so that the cooling air ca does not flow into any space other than the cooling fins 19a to 19d.

The thus-unified camera with electronic-cooling-device 20, which will be referred to the camera unit hereinafter, is arranged at a forward region of the inside of the housing 13.

Returning to FIG. 2, a description will be continued.

In the forward region of the inside of the housing 13, a rectangular tubular partitioning member (tubular heat insulating part) 21, which is somewhat smaller than the rectangular tube-like part 13a of the housing 13, is accommodated in the housing 13 in the state that a predetermined gap is present between each of the inner walls of the rectangular tube-like part 13a and the partitioning member 21. This partitioning member 21 is composed of a thin plate made of stainless steel, and a ceramic.

The gaps constitute a cooling passage Pa for causing a part of the cooling air ca (cooling air $ca_1$) to flow along the inner walls of the housing. The partitioning member 21 is partially connected to the housing inner walls through a plurality of rod-like members (not illustrated) arranged along the longitudinal direction of the housing.

The camera unit 20 is accommodated in this partitioning member 21.

In the state that the camera unit 20 is received, fin outer circumferential ends of the cooling fin group 19 are connected to the inner walls of the partitioning member 21, so that a part $ca_2$ of the cooling air flows also into gaps between the individual fins of the cooling fin group 19. The gaps between these cooling fins constitute a second cooling passage Pb (see FIG. 3(a)).

The individual cooling fins of the cooling fin group 19 are arranged in the tubular axis direction of the partitioning member 21.

A forward side end (flow direction changing part) 21a of the partitioning member 21 is bent into a direction perpendicular to the tubular axis direction of the housing 13, by a predetermined length, so as to be faced inwards and turned into an L-shaped form. The tip thereof is tapered at upper and lower regions and right and left regions so as to be opened by an angle θb (see FIG. 4). This angle θb is set into an angle slightly larger than the field angle θa of the lens 16a of the CCD camera 16.

A plate-like filter supporting member 22 is arranged at a forward side end of the camera 20 and in parallel to this forward side end 21a. A group of filters, which will be described later, are arranged in a hole made at the center of this filter supporting member 22.

In the figure, reference number 30 represents a heat insulating material covering the periphery of the body of the CCD camera 16, and thermally insulates others than a heat-radiating path communicated to the cooling fin group 19.

Figure 4:
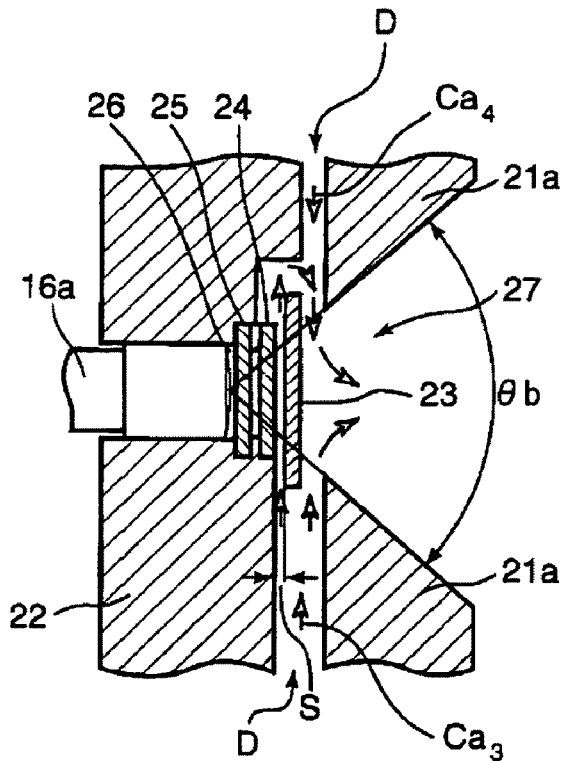
FIG. 4 is a main-portion enlarged view illustrating a filter part of the oven observing equipment illustrated in FIG. 2, and a peripheral structure thereof.

FIG. 4 is an enlarged view of the observing window and the structure of the vicinity thereof.

In the figure, reference number 23 represents a heat-resistant glass on which a multi-layered filter obtained by laminating an infrared reflecting filter on the inside of a heat-resistant glass is further laminated.

An infrared absorbing filter, an infrared reflecting filter, and a heat-resistant glass (24 to 26) are combined with each other with spacers interposed therebetween, and the combination is arranged to have a space S between the heat-resistant glass 23 and the combination, thereby constructing the observing window. The lens 16a of the CCD camera 16 is opposite to the heat-resistant glass 26.

After a part of the cooling air (cooling air $ca_2$) is passed through the second cooling passage Pb, the direction thereof is changed by 90° by the matter that the forward side end 21a is bent into the L-shaped form. The cooling air $ca_2$ then flows through a gap D between the filter supporting member 22 and the forward side end 21a, and are jointed with each other at the center of the heat-resistant glass 23. The resultant cooling air is directed outwards and then discharged from a central opening 27 to the outside of the housing 13.

A part of the cooling air (cooling air $ca_3$) flowing upwards in a gap between the filter supporting member 22 and the forward side end 21a is branched. The branched cooling airs flow on both of front and back sides of the heat-resistant glass 23 and are jointed to a part of the cooling air (cooling air $ca_4$) flowing downwards. In this way, the heat-resistant glass 23 can be effectively cooled from both surfaces thereof. Additionally, dust and others adhering to the outer surface of the heat-resistant glass 23 can be blown off by the cooling air $ca_3$ and $ca_4$.

The cooling air $ca_1$ that has flown in the cooling passage Pa is discharged from openings 13d, which will be described later, in the form of slits made in a front face plate 13c to the outside of the housing 13.

Figure 5:
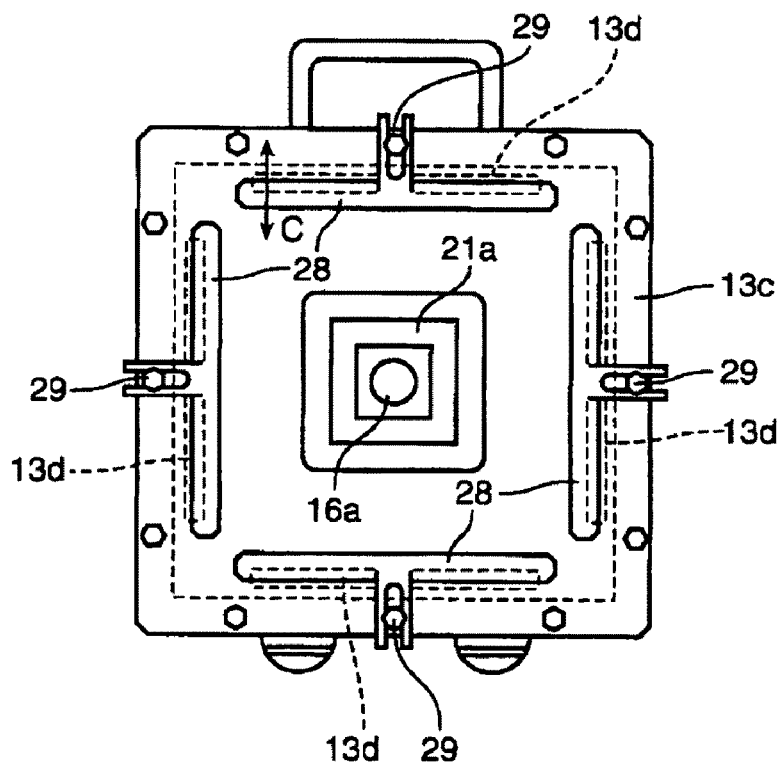
FIG. 5 is a front view illustrating the structure of a front face of the oven observing equipment.
Figure 6:
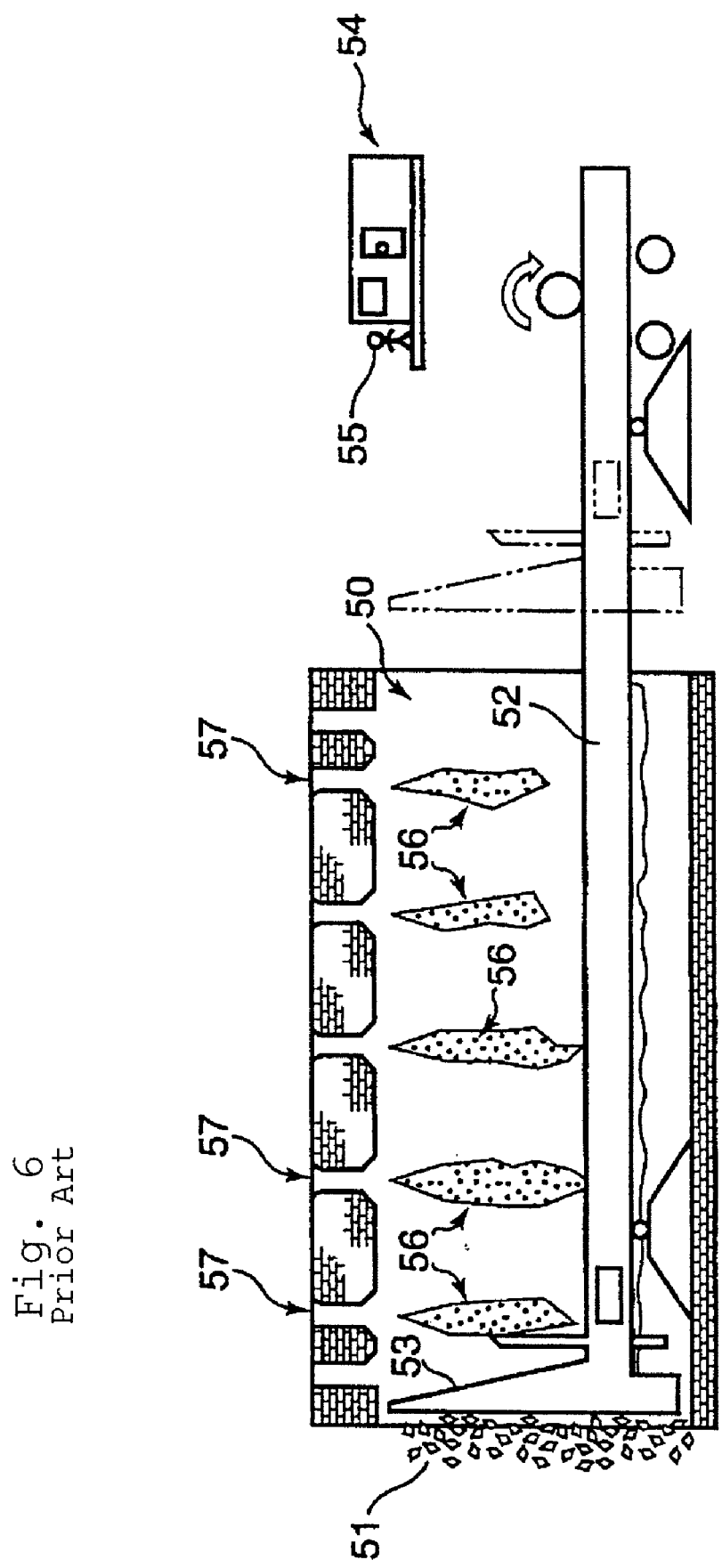
FIG. 6 is a side view for explaining a conventional oven observing method performed in an operation of pushing out coke.
Figure 7:
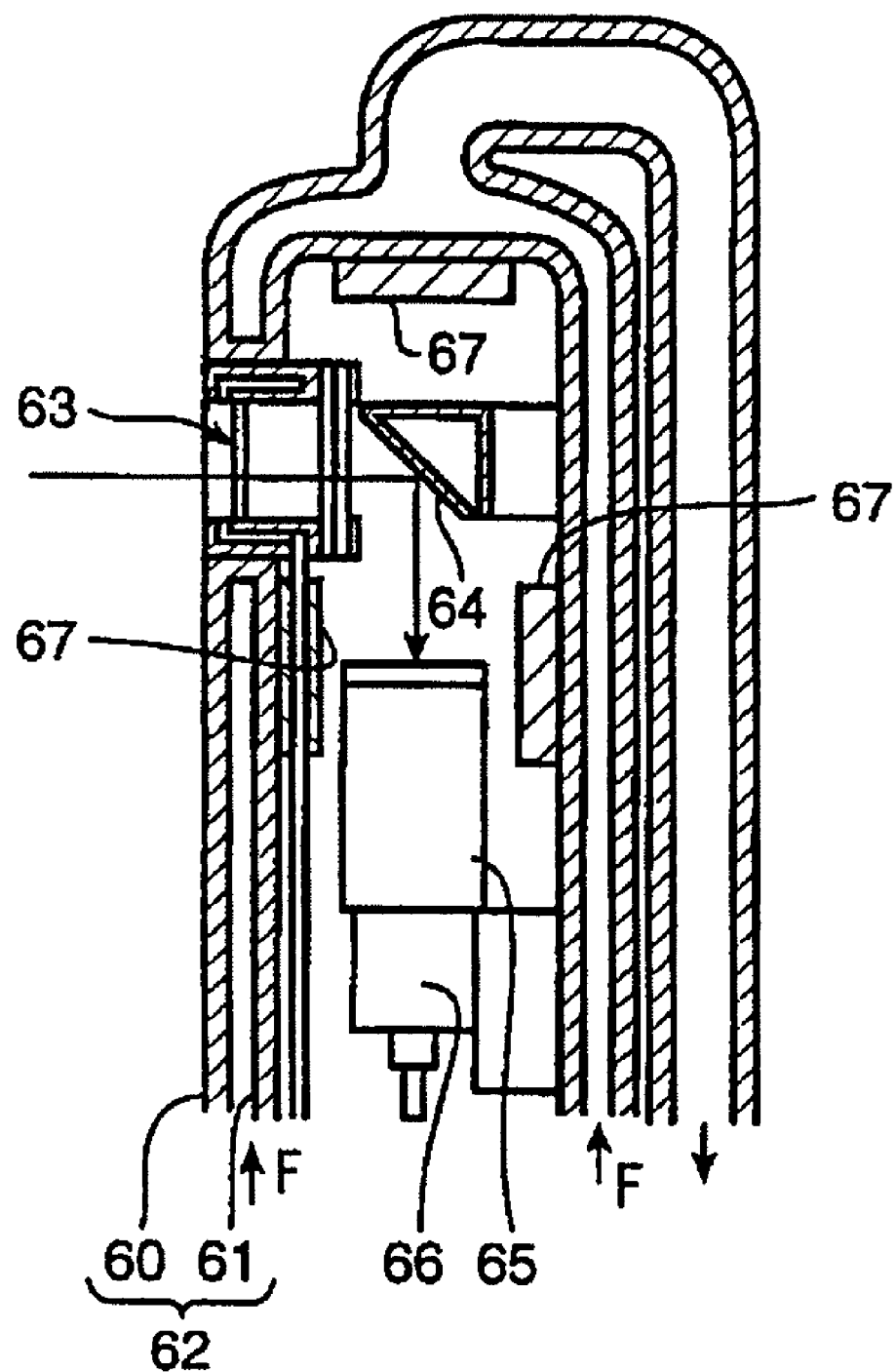
FIG. 7 is a sectional view illustrating the internal structure of a conventional oven observing equipment.

FIG. 5 is a view illustrating the arrangement of the slit-like openings 13d made in the front face plate 13c.

In the figure, the slit-like openings 13d are arranged at four sites in total, i.e., upper and lower sites and right and left sites in the state that a rectangular opening is arranged in line with each of the front face plate 13c. Each of the slit-like openings 13d is equipped with a cover 28 that is a band-like member having a slightly larger size than the size of the opening 13d.

This cover 28 can be moved in a direction (arrow C direction) perpendicular to the longitudinal direction of the slit-like opening 13d by loosing a screw 29. In this way, the flow rate of the cooling air $ca_1$ blown off from the slit-like opening 13d can be adjusted. This makes it possible to adjust the balance between the cooling air $ca_1$ amounts in accordance with the situation even if the balance is varied by a long-term use of the equipment. The blowing-off amount of the cooling air $ca_1$ is measured before the observing, and each slit-like opening is set to a predetermined gate opening degree.

The central opening 27 and the slit-like openings 13d illustrated in FIG. 4 constitute a discharging part for discharging the cooling air ca after the cooling air ca is used for cooling.

Incidentally, when the cooling air ca is supplied to the oven observing equipment 5 installed on the tip side of the ram beam 2, the temperature of the supplied cooling air ca is unfavorably raised to about 100° C. at the time when the cooling air ca reaches the oven observing equipment 5 even if a hose for supplying the cooling air ca is stored in the heat insulating pipe 12.

When the cooling air ca the temperature of which is raised as descried above is introduced into the housing 13, the surface temperature of the CCD camera 16 is unfavorably raised. The operation temperature range of the CCD camera 16 is usually from 0 to +40° C.; it is therefore necessary to lower the temperature of the cooling air ca, the raised temperature of which is 100° C., by about 60° C.

In some conventional oven observing equipments, a plurality of thermoelectric cooling elements are arranged, as cooling means, inside the equipments. However, observing equipments of this type, are each an equipment wherein thermoelectric cooling elements are attached merely to inner walls of the equipment and the space in the equipment, in which a CCD camera is set up, is first cooled, thereby cooling the CCD camera indirectly by the cooled atmosphere. For this reason, it is impossible to lower the temperature by about 60° C.

On the other hand, in the oven observing equipment 5 of the invention, the heat-absorbing side of the thermoelectric cooling element group 18 is adhered closely to the CCD camera 16 with the thermal conductor 17 interposed therebetween and the cooling fin group 19 is mounted onto the heat-radiating side of the thermoelectric cooling element group 18 so as to be integrated therewith, thereby causing the thermoelectric cooling element group 18 to operate for cooling effectively.

The thermoelectric cooling elements 18a to 18d, which constitute the thermoelectric cooling element group 18, function as small-sized heat pumps, and are made of an electronic component capable of adjusting local temperature precisely. The structure thereof is a structure composed of two ceramic plates; and semiconductor elements having pairs of n type and p type semiconductors arranged between the two ceramic plates. When current is sent to the structure through lead wires, one of the surfaces of the ceramics plates absorbs heat (cooling) and the other radiates heat (heating).

In the present embodiment, two thermoelectric cooling elements are laminated onto each other and the resultant is used to make cooling effect high. The external size (L×W×H) of each of the thermoelectric cooling elements 18a to 18a is, for example, 40×40×7 mm. The maximum temperature difference between the heat-absorbing face and the heat-radiating face may be 60° C. or higher.

The cooling operation is specifically described. The surface temperature of the CCD camera 16 is monitored with the thermocouple. When the temperature is higher than 40° C., the thermoelectric cooling element group 18 is turned on. When the thermoelectric cooling element group 18 is turned on, the heat-radiating side temperature becomes substantially equal to the temperature of the cooling air ca, the temperature of which is constantly kept at a predetermined temperature. For this reason, the thermoelectric cooling element group 18 can cool the CCD camera 16 stably. In this way, the surface temperature of the CCD camera 16 can be kept at 40° C. or lower so that the CCD camera 16 can be stably operated.

In FIG. 2, heat which invades the inside of the oven observing equipment 5 from the outside of the housing 13 is first blocked with the heat insulating material 14 adhering onto the inner walls of the housing 13. Thus, even if the heat partially penetrates through the heat insulating material 14, almost all of the heat is taken away by the cooling air $ca_1$ flowing in the cooling passage Pa. For this reason, only a small effect is produced onto the cooling air $ca_2$ passing through the cooling fin group 19 arranged in the second cooling passage Pb.

The following will describe the operation of the oven observing equipment 5 having the above-mentioned structure.

When the oven door is opened in the pushing-out operation of pushing out a red heat coke 51 subjected to dry distillation in the carbonizing chambers, the push-out ram 3 illustrated in FIG. 1 is inserted into the carbonizing chamber so that the ram head 1 at the forward end of the ram beam 2 pushes out the red heat coke.

While the push-out ram 3 is traveled in the carbonizing chambers, the oven observing equipment 5 set in a direction reverse to the direction in which the push-out ram 3 is inserted takes images of the oven walls of the carbonizing chambers from the pushing-out machine side toward the guide car side. The image signals are related to positional signal data of the push-out ram 3, and the resultant signals are outputted to the above-mentioned controller.

The cooling air ca is supplied through the pipe 12 to the oven observing equipment 5 at all times, and the cooling air ca supplied to the oven observing equipment 5 is separated into the cooling passage Pa and the second cooling passage Pb as illustrated in FIG. 2, so that the separated cooling airs flow in the housing 13.

The cooling air $ca_1$ flowing the cooling passage Pa absorbs heat which invades the inside of the housing 13 through the heat insulating material 14 adhered to the inner walls of the housing 13, and then the cooling air $ca_1$ supplied for heat exchange is discharged from the slit-like openings 13d equipped in the front face plate 13c to the outside of the housing 13.

The CCD camera 16 in the camera unit 20 contacts the heat-absorbing sides of the thermoelectric cooling elements 18a to 18d with the thermoconductive blocks 17a to 17d arranged around the camera 16, therefore, the CCD camera 16 is cooled by a matter that the thermoelectric cooling elements 18a to 18d are temperature-controlled.

Heat generated in the thermoelectric cooling elements 18a-18d is transferred to the cooling fins 19a to 19d. The cooling air $ca_2$ flows in the second cooling passage Pb, wherein these cooling fins 19a to 19d are arranged, at all times. For this reason, the heat generated by the thermoelectric cooling elements 18a-18d is radiated by the cooling air ca.

The cooling air $ca_2$ which has passed through the second cooling passage Pb so as to be supplied for heat change further flows the gap D (see FIG. 4) made between the forward side end of the partitioning member 21 and the filter supporting member 22, whereby the direction thereof is changed into a direction along which the cooling air ca is converged into the heat-resistant glass 23. As a result, dust and others are prevented from adhering onto the surface of the heat-resistant glass 23.

The cooling air $ca_2$ which has passed through the second cooling passage Pb partially flows also into the gap made between the heat-resistant glass 23 and the infrared absorbing filter 24 (see FIG. 4), thereby cooling the heat-resistant glass 23 effectively.

The oven observing equipment 5 may be an equipment which is operated (in only a single direction) when coke is pushed out by the push-out ram 3, or an equipment which is operated (in two directions) when coke is pushed out and the push-out ram 3 is returned.

Industrially Applicability

The oven observing equipment of the present invention can be preferably used in the case of observing the inside of a coke oven, a steel converter, a combustion furnace, an incinerating boiler, an electricity-producing boiler, or any other high-temperature furnace.

The invention claimed:

1. An oven observing equipment, comprising a housing having an intake part for cooling air and a discharging part for discharging the cooling air after being used for cooling, and an imaging device contained in the housing near the discharging part, wherein
   a tubular heat insulating part is disposed in the housing,
   the imaging device is disposed in the housing so as to be accommodated in the tubular heat insulating part and comprises an integrated combination of:
      an image sensor,
      plate-like thermoelectric cooling elements surrounding the image sensor, the plate-like thermoelectric cooling elements having heat-absorbing faces disposed about a periphery of the image sensor,
      a thermal conductor embedded in a gap between the periphery of the image sensor and the heat absorbing faces of the thermoelectric cooling elements, and
      cooling fins formed on outer heat-radiating faces of the thermoelectric cooling elements, and wherein
   a first cooling passage for causing the cooling air to flow is formed between an outer wall of the tubular heat insulating part and an inner wall of the housing,
   peripheries of the cooling fins are surrounded by the tubular heat insulating part, and
   gaps between the individual cooling fins constitute a second cooling passage for causing the cooling air to flow.

2. The oven observing equipment according to claim 1, wherein a heat insulating material is adhered onto the housing inner wall.

3. The oven observing equipment according to claim 1, wherein an observing window is formed in a front face of the housing at a position opposite to a lens of the image sensor, and this observing window is made of a lamination comprising a heat-resistant glass, an infrared absorbing filter, and an infrared reflecting filter.

4. The oven observing equipment according to claim 1, wherein a flow direction changing part is formed at an end part of the tubular heat insulating part on the downstream side of the flow direction of the cooling air, and the flow direction changing part is a part for changing the flow direction of the cooling air which has passed through the second cooling passage toward the observing window.

5. A push-out ram provided with oven observing equipment according to claim 1, wherein the oven observing equipment is arranged on a ram beam of the push-out ram, which is inserted in a coke oven.

6. The push-out ram provided with the oven observing equipment according to claim 5, and further comprising:
   a heat insulating pipe laid on the ram beam, the heat insulating pipe containing:
   a hose for supplying the cooling air to the oven observing equipment;
   a cable for supplying a power source to the image sensor and the thermoelectric cooling element and further outputting a taken image; and
   a cable for transmitting a control signal for controlling the temperature of the thermoelectric cooling element.

7. The push-out ram provided with the oven observing equipment according to claim 6, and further comprising:
   a tank for storing the cooling air; and
   a compressor for keeping the cooling air in the tank at a predetermined pressure;
   the tank and the compressor being mounted on the push-out ram.

8. A push-out ram provided with oven observing equipment according to claim 2, wherein the oven observing equipment is arranged on a ram beam of the push-out ram, which is inserted in a coke oven.

9. A push-out ram provided with oven observing equipment according to claim 3, wherein the oven observing equipment is arranged on a ram beam of the push-out ram, which is inserted in a coke oven.

10. A push-out ram provided with oven observing equipment according to claim 4, wherein the oven observing equipment is arranged on a ram beam of the push-out ram, which is inserted in a coke oven.

* * * * *